United States Patent
Koschabek et al.

(10) Patent No.: US 9,540,575 B2
(45) Date of Patent: Jan. 10, 2017

(54) METHOD FOR DEWAXING MINERAL OIL COMPOSITIONS

(75) Inventors: Rene Koschabek, Weinheim (DE); Torsten Stoehr, Frankfurt (DE); Markus Weber, Brensbach (DE); Andre Unglert, Frankfurt (DE); Wolfgang Tschepat, Darmstadt (DE)

(73) Assignee: Evonik Oil Additives GmbH, Darmstadt (DE)

( * ) Notice: Subject to any disclaimer, the term of this patent is extended or adjusted under 35 U.S.C. 154(b) by 243 days.

(21) Appl. No.: 13/982,498

(22) PCT Filed: Feb. 6, 2012

(86) PCT No.: PCT/EP2012/051911
§ 371 (c)(1),
(2), (4) Date: Jul. 30, 2013

(87) PCT Pub. No.: WO2012/107372
PCT Pub. Date: Aug. 16, 2012

(65) Prior Publication Data
US 2013/0306523 A1 Nov. 21, 2013

(30) Foreign Application Priority Data
Feb. 9, 2011 (DE) ........................ 10 2011 003 855

(51) Int. Cl.
| | | |
|---|---|---|
| *C10G 73/12* | (2006.01) | |
| *C10G 29/22* | (2006.01) | |
| *C08F 220/18* | (2006.01) | |
| *C10G 21/16* | (2006.01) | |
| *C10G 31/06* | (2006.01) | |
| *C10G 73/04* | (2006.01) | |
| *C10G 73/06* | (2006.01) | |
| *C10M 101/02* | (2006.01) | |

(52) U.S. Cl.
CPC ............. *C10G 73/12* (2013.01); *C08F 220/18* (2013.01); *C10G 21/16* (2013.01); *C10G 29/22* (2013.01); *C10G 31/06* (2013.01); *C10G 73/04* (2013.01); *C10G 73/06* (2013.01); *C10M 101/02* (2013.01); C10M 2203/1006 (2013.01); C10N 2270/00 (2013.01)

(58) Field of Classification Search
CPC ......... C10G 21/16; C10G 29/22; C10G 73/08; C10G 73/12
See application file for complete search history.

(56) References Cited

U.S. PATENT DOCUMENTS

| | | | |
|---|---|---|---|
| 3,729,296 A | 4/1973 | Miller | |
| 3,879,304 A * | 4/1975 | Waldbillig | ............ C08F 255/06 508/470 |
| 4,451,353 A | 5/1984 | Briens et al. | |
| 4,728,414 A | 3/1988 | West et al. | |
| 6,140,431 A | 10/2000 | Kinker et al. | |
| 7,728,093 B2 | 6/2010 | Scherer et al. | |
| 2005/0054775 A1* | 3/2005 | Haga et al. | .................... 525/163 |
| 2005/0148749 A1 | 7/2005 | Scherer et al. | |
| 2009/0048406 A1 | 2/2009 | Iroff et al. | |

FOREIGN PATENT DOCUMENTS

| | | |
|---|---|---|
| DE | 1 645 738 | 12/1970 |
| DE | 39 33 376 | 4/1991 |
| GB | 1 145 427 | 3/1969 |
| JP | 2000 336377 | 12/2000 |
| JP | 2000-336377 A | 12/2000 |
| JP | 2005-526873 | 9/2005 |
| JP | 2010-532807 | 10/2010 |
| SU | 685687 A1 | 9/1979 |
| SU | 887622 A1 | 12/1981 |
| WO | 03/074578 | 9/2003 |
| WO | 2009-007155 | 1/2009 |

OTHER PUBLICATIONS

International Search Report Issued Jul. 3, 2012 in PCT/EP12/051911 Filed Feb. 6, 2012.
Office Action issued Feb. 27, 2015 in European Patent Application No. 12 705 082.1 (with English language translation).
Decision to Grant a Patent issued May 18, 2016 in corresponding Russian Patent Application No. 2013141029/04 (062599), filed Feb. 6, 2012, with English translation, 18 pages.
Office Action issued Oct. 26, 2015 in corresponding Japanese Patent Application No. 2013-552918 (English translation).

* cited by examiner

*Primary Examiner* — Renee E Robinson
(74) *Attorney, Agent, or Firm* — Oblon, McClelland, Maier & Neustadt, L.L.P.

(57) ABSTRACT

The present invention relates to a lubricant composition for a process for reducing the paraffin content of mineral oil compositions, by providing a mineral oil composition with a dewaxing aid, cooling to form a paraffin precipitate and at least partly removing the paraffin precipitate formed. The dewaxing aid used is a copolymer mixture comprising at least three copolymers, the copolymers differing in the composition of the repeat units.

11 Claims, No Drawings

METHOD FOR DEWAXING MINERAL OIL COMPOSITIONS

CROSS REFERENCE TO RELATED APPLICATIONS

The present application is a 35 U.S.C. §371 national stage patent application of International patent application PCT/EP2011/051911, filed on Feb. 6, 2012, published as WO/2012/107372 on Aug. 16, 2012, the text of which is incorporated by reference, and claims the benefit of the filing date of German application no. 10 2011 003 855.8, filed on Feb. 9, 2011, the text of which is also incorporated by reference.

The present invention relates to processes for dewaxing mineral oil compositions.

For production of lubricant oils, the customarily used crude oils are subjected to a complex upgrading operation to match the different crude oil qualities to the user demands. In many cases, the wash distillates from the vacuum distillation of the crude oil are first freed of aromatics and heterocycles by solvent extraction.

However, the raffinates typically contain large amounts of paraffin wax, and so the pour points of the oils are correspondingly high. Therefore, the proportion of paraffin is lowered by solvent dewaxing.

A general description of the dewaxing process can be found in Sequeira, A. Jr., Lubricant Base Oil and Wax Processing, 1994.

Optimization of the dewaxing operation can be achieved by use of polymeric dewaxing aids (DWAs). Such DWAs influence the size and shape of the paraffin crystals, so as to give rise to compact structures which form a porous filter-cake permeable to the solvent/oil mixture. The filtration rate and oil yield can thus be increased considerably.

U.S. Pat. No. 4,451,353 describes mixtures of a poly-C10-C28-alkylacrylate and a poly-n-alkylmethacrylate (C10-C20) as a dewaxing aid. However, it is pointed out that exclusively linear polyalkylmethacrylates are used as mixture component.

DE-A-3933376 showed that, in the case of use of polyalkylmethacrylates mixture components with high degrees of branching of the alkyl radicals, better efficacy and more marked synergistic effects are achieved than with linear systems.

Tanasescu et al. (Rev. Chim. (Bucharest) 1998, 49 (9), 593-597) mentions the evaluation of copolymers of C10-18 methacrylates and styrene as a dewaxing aid in methyl ethyl ketone/toluene mixtures.

In addition, WO 03/074578 describes copolymers as dewaxing additives, which comprise repeat units derived from $C_{12}$-$C_{40}$-alkyl(meth)acrylates. In addition, the copolymers typically have a high proportion of short-chain alkyl (meth)acrylates and/or styrene. A specific mixture comprising three or more copolymers is not described in WO 03/074578.

The known lubricant compositions have a usable profile of properties. However, the provision of a process for reducing the paraffin content of mineral oil compositions having an improved profile of properties is a constant task.

In view of the prior art, it is thus an object of the present invention to provide a process for reducing the paraffin content of mineral oil compositions having an improved profile of properties.

More particularly, it was therefore an object of the present invention to provide a process for dewaxing mineral oil compositions which can be performed very inexpensively and using known plants. Moreover, the process was to have high performance in relation to the removal of the paraffin. More particularly, the removal apparatuses, for example the filters, were to be operable over a long period without interruption. Furthermore, the maintenance complexity of the removal apparatuses, for example of the filters, was to be low if possible.

Moreover, the process was to be usable for upgrading of many different mineral oil compositions without needing to adjust the various process parameters in a complex manner. Furthermore, the yield of upgraded mineral oil was to be at a maximum.

In addition, the performance of the process, especially the crystallization of the paraffin to be removed, was to be effected at comparatively high speed.

These objects, and further objects which are not stated explicitly but are immediately derivable or discernible from the connections discussed herein by way of introduction, are achieved by a process for reducing the paraffin content of mineral oil compositions having all the features of patent claim 1. Appropriate modifications to the inventive fuel composition are protected in the dependent claims referring back to claim 1.

The present invention accordingly provides a process for reducing the paraffin content of mineral oil compositions, by providing a mineral oil composition with a dewaxing aid, cooling to form a paraffin precipitate and at least partly removing the paraffin precipitate formed, characterized in that the dewaxing aid used is a copolymer mixture comprising at least four copolymers, the copolymers differing in the composition of the repeat units.

It is thus possible in an unforeseeable manner to provide a process for reducing the paraffin content of mineral oil compositions having an improved profile of properties.

More particularly, the process has high performance in relation to the removal of the paraffins. Accordingly, relatively large volumes of treated mineral oil composition can be freed of paraffin-containing precipitate. In addition, the removal apparatuses can be operated over a long period without interruption. Furthermore, the maintenance complexity of the removal apparatuses is very low.

Moreover, the process can be used for upgrading of many different mineral oil compositions without needing to adjust the various process parameters in a complex manner. Furthermore, the yield of upgraded mineral oil is very high, and this improvement is achieved for a multitude of different starting materials.

In addition, the performance of the process, especially the crystallization of the paraffin to be removed, can be effected at comparatively high speed.

Surprisingly, a copolymer mixture based on polyalkyl (meth)acrylate which is particularly preferred for achievement of the above-described properties of the present process can be produced very inexpensively.

The present invention describes processes for reducing the paraffin content of mineral oil compositions. Mineral oil compositions which can be upgraded in the context of the present invention are not subject to any particular restrictions. In general, these hydrocarbon compositions are based on crude oil which can be purified by distillation and/or refining and optionally further cleaning and upgrading processes, the term "mineral oil" being understood to mean especially the higher-boiling components of crude oil. In general, the boiling point of mineral oil is higher than 200° C., preferably higher than 300° C., at 5000 Pa (300° C. to 600° C. at 1.01325 bar). Production by low-temperature carbonization of shale oil, coking of hard coal, distillation of brown coal with exclusion of air, and hydrogenation of hard coal or brown coal is likewise possible. Accordingly, mineral oil compositions, according to origin, have different proportions of aromatic, cyclic, branched and linear hydrocarbons.

The present process can reduce the paraffin content of the mineral oil composition used. Paraffins in the sense of the present invention are especially alkanes having the general empirical formula $C_nH_{2n+2}$ and having a high number of carbon atoms. The number n may preferably be at least 16, more preferably at least 25. The alkanes to be removed typically lead to unfavorable cold flowability, such that the mineral oils solidify at relatively high temperatures. The melting temperature of the hydrocarbons depends on the degree of branching of the alkanes, such that linear alkanes having a high number of carbon atoms lead to poorer low-temperature characteristics than branched. Therefore, paraffins to be removed preferably have a melting temperature of at least 25° C., more preferably at least 10° C.

To perform the process according to the invention, a dewaxing aid is used. In the context of the present invention this aid is a copolymer mixture having at least four copolymers, the copolymers differing in the composition of the repeat units. The dewaxing aids used are preferably polyalkyl(meth)acrylates.

Polyalkyl(meth)acrylates are polymers which can be obtained by the polymerization of alkyl(meth)acrylates. The expression "(meth)acrylates" encompasses methacrylates and acrylates, and mixtures of the two. These monomers are widely known.

Polyalkyl(meth)acrylates comprise preferably at least 40% by weight, more preferably at least 60% by weight, especially preferably at least 80% by weight and very particularly at least 90% by weight of repeat units derived from alkyl(meth)acrylates.

Materials of particular interest include copolymers, especially polyalkyl(meth)acrylates, which preferably have a weight-average molecular weight $M_w$ in the range from 5000 to 5 000 000 g/mol, preferably 10 000 to 2 000 000 g/mol, more preferably 50 000 to 1 000 000 g/mol and most preferably 200 000 to 500 000 g/mol.

The number-average molecular weight $M_n$ may preferably be in the range from 3000 to 5 000 000 g/mol, preferably 5000 to 2 000 000 g/mol, more preferably 20 000 to 1 000 000 g/mol and most preferably 30 000 to 500 000 g/mol.

Additionally appropriate are copolymers, especially polyalkyl(meth)acrylates, whose polydispersity index $M_w/M_n$ is preferably in the range from 1.0 to 25.0, especially in the range from 1.2 to 20.0, more preferably in the range from 1.2 to 17.0 and most preferably in the range from 1.5 to 15.0. In a particular embodiment, the polydispersity index $M_w/M_n$ may preferably be at least 2, more preferably at least 5. The number-average and weight-average molecular weights can be determined by known processes, for example gel permeation chromatography (GPC), preferably using a PMMA standard.

The various copolymers of the copolymer mixture are preferably compliant with these values, and so the copolymer mixture preferably has the molecular weight and polydispersity index values detailed for the copolymers.

Preferred copolymer mixtures comprise at least four, more preferably at least five, copolymers, each of these copolymers comprising
a) 0 to 50% by weight, preferably 0 to 25% by weight, of repeat units derived from (meth)acrylates of the formula (I)

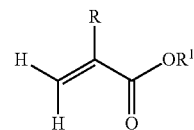

in which R is hydrogen or methyl and $R^1$ is an alkyl radical having 1 to 11 carbon atoms,
b) 0 to 100% by weight, preferably 0.1 to 90% by weight, of repeat units derived from (meth)acrylates of the formula (II)

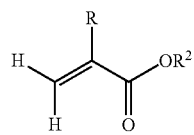

in which R is hydrogen or methyl and $R^2$ is an alkyl radical having 12 to 15 carbon atoms, and
c) 0 to 100% by weight, preferably 40 to 100% by weight and more preferably 60 to 99% by weight of repeat units derived from (meth)acrylates of the formula (III)

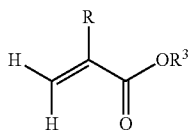

in which R is hydrogen or methyl and $R^3$ is an alkyl radical having 16 to 40 carbon atoms.

The copolymers, preferably the polyalkyl(meth)acrylates, can preferably be obtained by free-radical polymerization. Accordingly, the proportion by weight of the respective repeat units that these polymers have results from the proportions by weight of corresponding monomers used to prepare the polymers.

The inventive copolymer mixtures comprising at least 4, more preferably at least 5, copolymers are preferably prepared by copolymerization of a monomer mixture consisting of at least one acrylate and at least one methacrylate in one polymerization step.

Examples of (meth)acrylates of the formula (I) include linear and branched (meth)acrylates which derive from saturated alcohols, such as methyl(meth)acrylate, ethyl (meth)acrylate, n-propyl(meth)acrylate, isopropyl(meth) acrylate, n-butyl(meth)acrylate, tert-butyl(meth)acrylate, pentyl(meth)acrylate, hexyl(meth)acrylate, 2-ethylhexyl (meth)acrylate, heptyl(meth)acrylate, 2-tert-butylheptyl (meth)acrylate, octyl(meth)acrylate, 3-isopropylheptyl (meth)acrylate, nonyl(meth)acrylate, decyl(meth)acrylate and undecyl(meth)acrylate; and cycloalkyl(meth)acrylates such as cyclopentyl(meth)acrylate, cyclohexyl(meth)acrylate, 3-vinylcyclohexyl(meth)acrylate, bornyl(meth)acrylate.

The (meth)acrylates of the formula (II) include especially linear and branched (meth)acrylates which derive from saturated alcohols, such as 5-methylundecyl(meth)acrylate, dodecyl(meth)acrylate, 2-methyldodecyl(meth)acrylate, tridecyl(meth)acrylate, 5-methyltridecyl(meth)acrylate, tetradecyl(meth)acrylate, pentadecyl(meth)acrylate; (meth)acrylates which derive from unsaturated alcohols, for example oleyl(meth)acrylate; cycloalkyl(meth)acrylates such as 2,4-di-t-butylcyclohexyl(meth)acrylate.

Examples of monomers of the formula (III) include linear and branched (meth)acrylates which derive from saturated alcohols, such as hexadecyl(meth)acrylate, 2-methylhexadecyl(meth)acrylate, 2-methylpentadecyl(meth)acrylate, 2-ethyltetradecyl(meth)acrylate, 2-propyltridecyl(meth)acrylate, 2-butyldodecyl(meth)acrylate, 2-methylhexadecyl(meth)acrylate, 2-pentyldodecyl(meth)acrylate, 2-hexyldecyl(meth)acrylate, 2-hexylundecyl(meth)acrylate, n-heptadecyl(meth)acrylate, 5-isopropylheptadecyl(meth)acrylate, 4-tert-butyloctadecyl(meth)acrylate, 5-ethyloctadecyl(meth)acrylate, 3-isopropyloctadecyl(meth)acrylate, octadecyl(meth)acrylate, nonadecyl(meth)acrylate, eicosyl(meth)acrylate, cetyleicosyl(meth)acrylate, stearyleicosyl(meth)acrylate, docosyl(meth)acrylate and/or eicosyltetratriacontyl(meth)acrylate; cycloalkyl(meth)acrylate, such as 2,4,5-tri-t-butyl-3-vinylcyclohexyl(meth)acrylate, 2,3,4,5-tetra-t-butylcyclohexyl(meth)acrylate.

Alkyl(meth)acrylates having a long-chain alcohol radical, especially components (II) and (III), can be obtained, for example, by reacting (meth)acrylates and/or the corresponding acids with long-chain fatty alcohols, generally forming a mixture of esters, for example (meth)acrylates with various long-chain alcohol radicals. These fatty alcohols include Oxo Alcohol® 7911, Oxo Alcohol® 7900, Oxo Alcohol® 1100; Alfol® 610, Alfol® 810, Lial® 125 and Nafol® products (Sasol); Alphanol® 79 (ICI); Epal® 610 and Epal® 810 (Afton); Linevol® 79, Linevol® 911 and Neodol® 25E (Shell); Dehydad®, Hydrenol® and Lorol® products (Cognis); Acropol® 35 and Exxal® 10 (Exxon Chemicals); Kalcol® 2465 (Kao Chemicals).

If alkyl(meth)acrylates of formula (II) and of formula (III) are used, the weight ratio of these monomers may be within a wide range. The ratio of monomers of the formula (II) having 12 to 15 carbon atoms in the alcohol radical to the monomers of the formula (III) having 16 to 40 carbon atoms in the alcohol radical is preferably in the range from 5:1 to 1:100, more preferably in the range from 1:1 to 1:50, especially preferably 1:2 to 1:10.

In a particular configuration, the copolymer mixture may comprise copolymers derived from monomers having 16 to 18 carbon atoms and from monomers having 19 to 40 carbon atoms. The weight ratio of alkyl(meth)acrylates of monomers having 16 to 18 carbon atoms in the alcohol radical to the monomers having 19 to 40 carbon atoms in the alcohol radical may preferably be within the range from 100:1 to 1:100, more preferably in the range from 50:1 to 1:50, especially preferably 10:1 to 1:10.

In addition, the monomer mixture for preparation of the copolymers, especially polyalkyl(meth)acrylates, for use in accordance with the invention may comprise monomers copolymerizable with the (meth)acrylates of the formulae (I), (II) and/or (III). These include
aryl(meth)acrylates such as benzyl methacrylate or
phenyl methacrylate, where the aryl radicals may in each case be unsubstituted or up to tetrasubstituted;
styrene monomers, for example styrene, substituted styrenes having an alkyl substituent in the side chain, for example α-methylstyrene and α-ethylstyrene, substituted styrenes having an alkyl substituent on the ring, such as vinyltoluene and p-methylstyrene, halogenated styrenes, for example monochlorostyrenes, dichlorostyrenes, tribromostyrenes and tetrabromostyrenes;
maleic acid and maleic acid derivatives, for example maleic monoesters, maleic diesters, maleic anhydride, methylmaleic anhydride, maleimide, methylmaleimide; itaconic acid and itaconic acid derivatives, for example itaconic monoesters, itaconic diesters and itaconic anhydride;
fumaric acid and fumaric acid derivatives, for example fumaric monoesters, fumaric diesters and fumaric anhydride.

In a particular embodiment, it is especially possible to use dispersing monomers.

Dispersing monomers have long been used for functionalization of polymeric additives in lubricant oils and are therefore known to those skilled in the art (cf. R. M. Mortier, S. T. Orszulik (eds.): "Chemistry and Technology of Lubricants", Blackie Academic & Professional, London, $2^{nd}$ ed. 1997). It is appropriately possible to use particularly heterocyclic vinyl compounds and/or ethylenically unsaturated, polar ester or amide compounds of the formula (IV)

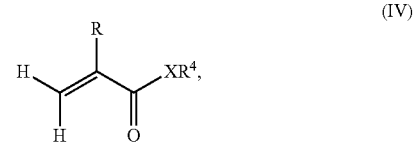

in which R is hydrogen or methyl, X is oxygen, sulfur or an amino group of the formula —NH— or —$NR^a$—, in which $R^a$ is an alkyl radical having 1 to 10 and preferably 1 to 4 carbon atoms, $R^4$ is a radical which comprises 2 to 50, especially 2 to 30 and preferably 2 to 20 carbon atoms and has at least one heteroatom, preferably at least two heteroatoms, as dispersing monomers.

Examples of dispersing monomers of the formula (IV) include aminoalkyl(meth)acrylates, aminoalkyl(meth)acrylamides, hydroxylalkyl(meth)acrylates, heterocyclic(meth)acrylates and/or carbonyl-containing (meth)acrylates.

The hydroxyalkyl(meth)acrylates include
2-hydroxypropyl(meth)acrylate,
3,4-dihydroxybutyl(meth)acrylate,
2-hydroxyethyl(meth)acrylate,
3-hydroxypropyl(meth)acrylate,
2,5-dimethyl-1,6-hexanediol(meth)acrylate and
1,10-decanediol(meth)acrylate.

Carbonyl-containing (meth)acrylates comprise, for example,
2-carboxyethyl(meth)acrylate,
carboxymethyl(meth)acrylate,
N-(methacryloyloxy)formamide,
acetonyl(meth)acrylate,
mono-2-(meth)acryloyloxyethyl succinate,
N-(meth)acryloylmorpholine,
N-(meth)acryloyl-2-pyrrolidinone,
N-(2-(meth)acryloyloxyethyl)-2-pyrrolidinone,
N-(3-(meth)acryloyloxypropyl)-2-pyrrolidinone,
N-(2-(meth)acryloyloxypentadecyl)-2-pyrrolidinone,
N-(3-(meth)acryloyloxyheptadecyl)-2-pyrrolidinone and
N-(2-(meth)acryloyloxyethyl)ethyleneurea.
2-Acetoacetoxyethyl(meth)acrylate The heterocyclic(meth)acrylates include
2-(1-imidazolyl)ethyl(meth)acrylate,
oxazolidinylethyl(meth)acrylate,
2-(4-morpholinyl)ethyl(meth)acrylate,
1-(2-methacryloyloxyethyl)-2-pyrrolidone,
N-methacryloylmorpholine,
N-methacryloyl-2-pyrrolidinone, N-(2-methacryloyloxyethyl)-2-pyrrolidinone,
N-(3-methacryloyloxypropyl)-2-pyrrolidinone.

The aminoalkyl(meth)acrylates include especially
N,N-dimethylaminoethyl(meth)acrylate,
N,N-dimethylaminopropyl(meth)acrylate,
N,N-diethylaminopentyl(meth)acrylate,
N,N-dibutylaminohexadecyl(meth)acrylate.

In addition, it is possible to use aminoalkyl(meth)acrylamides as dispersing monomers, such as N,N-dimethylaminopropyl(meth)acrylamide.

In addition, it is possible to use phosphorus-, boron- and/or silicon-containing (meth)acrylates as dispersing monomers, such as
2-(dimethylphosphato)propyl(meth)acrylate,
2-(ethylenephosphito)propyl(meth)acrylate,
dimethylphosphinomethyl(meth)acrylate,
dimethylphosphonoethyl(meth)acrylate,
diethyl(meth)acryloylphosphonate,
dipropyl(meth)acryloylphosphate,
2-(dibutylphosphono)ethyl(meth)acrylate,
2,3-butylene(meth)acryloylethylborate,
methyldiethoxy(meth)acryloylethoxysilane,
diethylphosphatoethyl(meth)acrylate.

The preferred heterocyclic vinyl compounds include 2-vinylpyridine, 3-vinylpyridine, 4-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, N-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles.

The particularly preferred dispersing monomers include especially ethylenically unsaturated compounds comprising at least one nitrogen atom, these being selected with particular preference from the above-detailed heterocyclic vinyl compounds and/or aminoalkyl(meth)acrylates, aminoalkyl (meth)acrylamides and/or heterocyclic(meth)acrylates.

The proportion of comonomers can be varied according to the end use and profile of properties of the polymer. In general, this proportion may be in the range from 0 to 30% by weight, preferably 0.01 to 20% by weight and more preferably 0.1 to 10% by weight.

The dewaxing aid copolymer mixtures used may more preferably be those which comprise at least four, preferably at least five and especially at least six copolymers which differ in the composition of the repeat units. Particular preference is given to using copolymer mixtures whose copolymers are characterized by a continuous variation in the composition of the repeat units.

In the case of preparation of copolymers in a batch process too, the composition of the individual copolymers can vary slightly over the duration of the polymerization process. However, in the case of customary processes, these copolymers will be definable as a single copolymer since the copolymer composition remains constant in relation to the repeat units and the various copolymers generally have usually only a slight variation. For clarification, in the context of the present invention, a "single copolymer" is interpreted as meaning polymeric compounds whose composition differs in relation to the repeat units by a maximum of 2% by weight, preferably by a maximum of 1% by weight, on the basis that the repeat unit having the maximum difference has a proportion by weight in at least one of the copolymers of at least 2% by weight. In the repeat units derived from alkyl(meth)acrylates detailed above, the branches are not taken into account, and so repeat units having an identical number of carbon atoms and derived from alkyl(meth)acrylates are considered to be identical. The same applies to other monomers derived from alcohols or esters, such as maleic acid derivatives.

Preferably at least four, more preferably at least five, of the copolymers in the copolymer mixture each differ in the composition of the repeat units by at least 3% by weight, preferably at least 5% by weight and more preferably at least 10% by weight, based on the proportion by weight of the respective repeat units in the copolymer having the higher proportion of the repeat unit in question. The difference between two copolymers is given by the difference in the proportion by weight of the repeat unit which has a proportion by weight of at least one of the copolymers of at least 2% by weight, preferably at least 4% by weight, based on the total weight of the copolymer, from the maximum difference. This definition applies to any combination of the at least four, preferably at least five, different copolymers, and the repeat units used to determine the difference may vary in each case.

The proportion of any single copolymer in the copolymer mixture is preferably at most 70% by weight, more preferably at most 50% by weight and especially preferably at most 30% by weight.

Surprising advantages can be achieved especially by a copolymer mixture having a broad crystallization transition. In a particular aspect of the present invention, preferred copolymer mixtures have a crystallization transition having a half-height width of at least 5° C., preferably at least 8° C. and most preferably at least 10° C. The half-height width is based on the difference between the maximum heat flow temperature and the temperature on commencement of crystallization (onset temperature). The copolymer mixture may preferably have a crystallization transition in the range from 20 to 55° C., more preferably in the range from 30 to 50° C. The crystallization transition can be determined by means of dynamic differential calorimetry (DSC) using the second cooling curve with a cooling rate of 2° C. per minute.

More preferably, the copolymers in the copolymer mixture may have preferably at least 50% by weight, especially at least 70% by weight and most preferably at least 90% by weight of repeat units derived from alkyl(meth)acrylates having 12 to 40 carbon atoms in the alkyl radical. The proportion of copolymers having repeat units derived from alkyl(meth)acrylates having 12 to 40 carbon atoms in the alkyl radical in the copolymer mixture may be preferably at least 30% by weight, more preferably at least 60% by weight and most preferably at least 90% by weight. Accordingly, particularly preferred copolymer mixtures have at least 60% by weight of copolymers having at least 70% by weight and most preferably at least 90% by weight of repeat units derived from alkyl(meth)acrylates having 12 to 40 carbon atoms in the alkyl radical.

Of particular interest are especially dewaxing aids in which at least two, preferably at least three, especially at least four and more preferably at least five of the copolymers comprise at least two different repeat units derived from alkyl(meth)acrylates having 12 to 40 carbon atoms in the alkyl radical, the copolymers differing in the number-average number of carbon atoms in the alkyl radical of the alkyl(meth)acrylates, and the difference in the number-average being at least two and preferably at least three carbon atoms, without any intention that this should impose a restriction.

In addition, preference is given to copolymer mixtures having at least four and preferably five individual copolymers, the copolymers of which each have repeat units derived from alkyl acrylates and repeat units derived from alkyl(meth)acrylates.

Preferred repeat units are especially units derived from alkyl methacrylates having 16 to 18 carbon atoms and units derived from alkyl acrylates having 19 to 22 carbon atoms. Surprising advantages can be achieved especially with copolymer mixtures in which at least one single copolymer preferably has at least 20% by weight, more preferably at least 30% by weight and more preferably at least 40% by weight of repeat units derived from alkyl acrylates having 19 to 22 carbon atoms. Preferably, a single copolymer in the mixtures has at least 40% by weight and more preferably at least 60% by weight of repeat units derived from alkyl methacrylates having 16 to 18 carbon atoms.

In a further embodiment, the copolymer mixtures may be present copolymers with repeat units derived from alkyl acrylates having 16 to 18 carbon atoms, and repeat units which are of alkyl methacrylates having 19 to 22 carbon atoms. Preference is given here to copolymer mixtures in which preferably at least one single polymer has at least 20% by weight, more preferably at least 30% by weight and more preferably at least 40% by weight of repeat units derived from alkyl methacrylates having 19 to 22 carbon atoms. Preferably, a single copolymer in the mixtures has at least 40% by weight and more preferably at least 60% by weight of repeat units derived from alkyl acrylates having 16 to 18 carbon atoms.

In a particular aspect of the present invention, it is possible to use a copolymer mixture comprising at least three copolymers having at least two different repeat units derived from alkyl(meth)acrylates having 12 to 40 carbon atoms in the alkyl radical, at least one first copolymer having a higher proportion of repeat units derived from alkyl(meth)acrylates having 19 to 22 carbon atoms in the alkyl radical than at least two of the other copolymers; at least one second copolymer having a higher proportion of repeat units derived from alkyl(meth)acrylates having 12 to 18 carbon atoms in the alkyl radical than at least two of the other copolymers; and at least one third copolymer having repeat units derived from alkyl(meth)acrylates having 19 to 22 carbon atoms in the alkyl radical and having repeat units derived from alkyl(meth)acrylates having 12 to 18 carbon atoms in the alkyl radical, the proportion in the third copolymer of repeat units derived from alkyl(meth)acrylates having 19 to 22 carbon atoms in the alkyl radical being lower than the proportion of these repeat units in the first copolymer, and the proportion in the third copolymer of repeat units derived from alkyl(meth)acrylates having 12 to 18 carbon atoms in the alkyl radical being lower than the proportion of these repeat units in the second copolymer.

The copolymer mixtures detailed above are novel and likewise form part of the subject matter of the present invention.

The copolymer mixtures used as dewaxing aids in accordance with the invention can be obtained by separate polymerization of at least four and preferably at least five different copolymers.

For instance, these polymers can be prepared especially by free-radical polymerization, and also related processes, for example ATRP (=Atom Transfer Radical Polymerization) or RAFT (=Reversible Addition Fragmentation Chain Transfer).

Customary free-radical polymerization is explained, inter alia, in Ullmanns's Encyclopedia of Industrial Chemistry, Sixth Edition. In general, a polymerization initiator and a chain transferer are used for this purpose. The usable initiators include the azo initiators well known in the technical field, such as AIBN and 1,1-azobiscyclohexanecarbonitrile, and also peroxy compounds such as methyl ethyl ketone peroxide, acetylacetone peroxide, dilauryl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl)peroxydicarbonate, mixtures of two or more of the aforementioned compounds with one another, and also mixtures of the aforementioned compounds with compounds which have not been mentioned and can likewise form free radicals. Suitable chain transferers are especially oil-soluble mercaptans, for example n-dodecyl mercaptan or 2-mercaptoethanol, or else chain transferers from the class of the terpenes, for example terpinolene.

The ATRP process is known per se. It is assumed that this is a "living" free-radical polymerization, without any intention that this should restrict the description of the mechanism. In these processes, a transition metal compound is reacted with a compound which has a transferable atom group. This transfers the transferable atom group to the transition metal compound, which oxidizes the metal. This reaction forms a radical which adds onto ethylenic groups. However, the transfer of the atom group to the transition metal compound is reversible, so that the atom group is transferred back to the growing polymer chain, which forms a controlled polymerization system. The structure of the polymer, the molecular weight and the molecular weight distribution can be controlled correspondingly. This reaction is described, for example, by J-S. Wang, et al., J. Am. Chem. Soc., vol. 117, p. 5614-5615 (1995), by Matyjaszewski, Macromolecules, vol. 28, p. 7901-7910 (1995). In addition, the patent applications WO 96/30421, WO 97/47661, WO 97/18247, WO 98/40415 and WO 99/10387, disclose variants of the ATRP explained above.

In addition, the inventive polymers may be obtained, for example, also via RAFT methods. This process is presented in detail, for example, in WO 98/01478 and WO 2004/083169, which are cited explicitly for the purposes of disclosure. In addition, the inventive polymers are obtainable by NMP (nitroxide-mediated polymerization) processes, which are described in U.S. Pat. No. 4,581,429 inter alia. A comprehensive description, more particularly with further references, is given for these methods, inter alia, in K. Matyjaszewski, T. P. Davis, Handbook of Radical Polymerization, Wiley Interscience, Hoboken 2002, which is cited explicitly for the purposes of disclosure.

More preferably, the polymers are prepared by means of processes in which the monomer composition is altered stepwise or continuously over the course of the polymerization. It is thus directly possible to obtain copolymer mixtures which can be used as a dewaxing aid. Such processes are described in detail in publications WO 2009/007155, filed on May 9, 2008 at the European patent office with application number PCT/EP2008/055727, and U.S. Pat. No. 6,140,431, filed on Jan. 12, 1998 at the American patent office (USPTO) with application Ser. No. 09/023,149, the processes described in these publications and the copolymers detailed therein etc. being incorporated into this application for the purposes of disclosure.

In addition, the copolymer mixtures described can be obtained via a copolymerization of acrylates and methacrylates, since the different copolymerization parameters bring about a continuous change in the copolymer composition.

The polymerization can be performed with or without solvent. The term "solvent" should be understood here in a broad sense. The solvents to be used include hydrocarbon solvents, for example aromatic solvents such as toluene, benzene and xylene, saturated hydrocarbons, for example cyclohexane, heptane, octane, nonane, decane, dodecane, which may also be in branched form. These solvents can be used individually or else as a mixture. Particularly preferred solvents are mineral oils, natural oils and synthetic oils, and mixtures thereof.

The polymerization can be performed under standard pressure, reduced pressure or elevated pressure. The polymerization temperature is also uncritical. In general, however, it is in the range of $-20°$-$200°$ C., preferably $0°$-$130°$ C. and more preferably $60°$-$120°$ C.

Preferred processes for reduction of the paraffin content of mineral oil compositions feature the performance thereof in the presence of a solvent. The solvents used with preference for dewaxing include aliphatic hydrocarbons having a low boiling point, which is preferably not more than $150°$ C. at standard pressure, including the self-cooling gases such as propane, propylenes, butane, pentane, and also isooctane. A further group of solvents used with preference to reduce the paraffin content is that of aromatic hydrocarbons, for example toluene, xylene, carbonyl compounds, especially ketones, for example acetone, dimethyl ketone, methyl ethyl ketone, methyl propyl ketone, methyl isobutyl ketone, and halogenated hydrocarbons such as methylene chloride, dichloroethane, or N-alkylpyrrolidones such as N-methylpyrrolidone, N-ethylpyrrolidone.

Particular advantages can be achieved especially through use of carbonyl compounds and/or aromatic hydrocarbons.

Also advantageous are mixtures of solvents, for example of ketones and aromatic hydrocarbons, such as methyl ethyl ketone/toluene or methyl isobutyl ketone/toluene.

The solvent can advantageously be used in amounts of 5 to 95% by weight, preferably 20 to 90% by weight, more preferably 50 to 85% by weight, based on the solvent-admixed mineral oil composition to be cooled.

The process for reducing the paraffin content of mineral oil compositions further comprises the steps known from the prior art. For instance, the mineral oil composition to be upgraded is first provided with a dewaxing aid and cooled to form a paraffin precipitate, and the paraffin precipitate formed is at least partly removed.

The mixing of mineral oil composition to be upgraded with a dewaxing aid can be effected at any customary temperature, these temperatures being preferably within the range from $-100$ to $150°$ C., especially in the range from $-50$ to $90°$ C. and more preferably in the range from $-40$ to $80°$ C. The temperature used here depends on the nature of the solvent, the low temperatures applying particularly to dewaxing with propane, propene, butane, butene or other compounds having a low boiling temperature as solvents. These low-boiling solvents are in many cases kept in liquid form by means of pressure. Surprising advantages can be achieved, inter alia, by heating the mineral oil composition with an added dewaxing aid to a temperature above the cloud point to EN 23015.

After the dewaxing aid has been mixed with the mineral oil composition, the mixture obtained is cooled to form a paraffin precipitate. The cooling rate and the final temperature are not subject to any particular conditions; rapid cooling and a high final temperature may be advisable for economic reasons, but can adversely affect the removability of the paraffin precipitate obtained and the quality of the upgraded mineral oil. On the other hand, slow cooling and a low final temperature lead to good removal characteristics of the paraffin precipitate obtained.

Surprising advantages can be achieved especially with cooling rates in the range from 0.1 to $100°$ C., more preferably in the range from 2 to $40°$ C., per minute. The final temperature is preferably in the range from $-60$ to $10°$ C., more preferably in the range from $-40$ to $-10°$ C.

The paraffin precipitate can be removed from the composition by any known removal process for separation of solid/liquid mixtures, for example sedimentation, decantation, centrifugation and filtration.

Surprising advantages can be achieved especially by filtration, it being possible with preference to use drum filters.

The process according to the invention is particularly effective, and the yield of upgraded mineral oil is excellent. Moreover, very high filtration volumes are achieved within a short time, the filters being operable continuously over a long period if the filtercake is removed automatically from the filter.

The present invention is to be illustrated with reference to examples and comparative examples, without any intention that this should impose a restriction.

EXAMPLES AND COMPARATIVE EXAMPLES

General Preparation Method for the Polymers

In a 2 L reaction flask of an apparatus with sabre stirrer, condenser, temperature regulator with PT100, syringe pump and $N_2$ feed line, 850.0 g of monomers, 143.6 g of 100N oil and 1.0 g of dodecyl mercaptan were weighed in. The apparatus was inertized and heated to $110°$ C. A further 6.4 g of 100N oil were admixed with 2.1 g of tert-butyl per-2-ethylhexanoate. After the mixture in the reaction flask had reached a temperature of $110°$ C., the feed of the oil/initiator mixture was started by means of the pump.

The addition was effected at $110°$ C. over 3 h. 5% of the solution was metered in within the first hour, 25% within the second hour and 70% of the mixture in the last hour. 2 h after the end of the feed, another 1.7 g of tert-butyl per-2-ethylhexanoate were added and the mixture was stirred at $110°$ C. for 1 h. This gave an 85.0% clear solution or colorless waxy solid (examples 1 and 2 and comparative examples 1 and 2).

The process described above was used to polymerize the monomer mixtures described in table 1. In the case of use of acrylates and methacrylates, copolymer mixtures whose individual copolymers feature a continuously changing composition with regard to the repeat units were obtained.

TABLE 1

| | BehA [% by wt.] | SMA [% by wt.] | DPMA [w % by wt.] | Styrene [% by wt.] |
|---|---|---|---|---|
| Example 1 | 68.0 | 32.0 | — | — |
| Example 2 | 60.0 | 40.0 | — | — |
| Comparative example 1 | 90.0 | — | — | 10.0 |
| Comparative example 2 | 100.0 | — | — | — |

TABLE 1-continued

|  | BehA [% by wt.] | SMA [% by wt.] | DPMA [w % by wt.] | Styrene [% by wt.] |
|---|---|---|---|---|
| Comparative example 3 | — | 30.0 | 70.0 | — |
| Comparative example 4 | — | 90.0 | — | 10.0 |
| Comparative example 5 | — | 100.0 | — | — |

BehA: behenyl acrylate (acrylate having 18 to 22 carbon atoms in the alkyl radical, average of 20 carbon atoms)
SMA: stearyl methacrylate (methacrylate having 16 to 18 carbon atoms in the alkyl radical, average of 17.3 carbon atoms)
DPMA: dodecyl-pentadecyl methacrylate (Alcohol: Neodol 25)

The polymers obtained were additionally used to make up the mixtures described in table 2. The percentages are based on the polymers containing.

TABLE 2

| Polymers used for preparation of the mixture |
|---|

| Comparative example 6 | 55% by wt. of comparative example 2 | 45% by wt. of comparative example 3 |  |
|---|---|---|---|
| Comparative example 7 | 60% by wt. of comparative example 3 | 20% by wt. of comparative example 1 | 20% by wt. of comparative example 4 |
| Comparative example 8 | 60% by wt. of comparative example 2 | 40% by wt. of comparative example 5 |  |

To distinguish the performance of the dewaxing aids produced, a laboratory filtration test which allows the measurement of oil yield and filtration rate was used. Especially in the case of the latter, great differences can be elucidated among the examples.

Performance of the Filtration Test

The filtration apparatus consisted of a steel filter with a lid and cooling jacket, and was cooled with the aid of a cryostat in circulation. A customary filter cloth from a dewaxing plant in a refinery was used. The filter volume was 100 ml. The filter was connected to a measuring cylinder via a glass attachment with a 2-way tap. By means of a rotary-vane oil pump, a pressure-reducing valve and a manometer, it was possible to apply a defined vacuum to the filtration apparatus. The mineral oil distillate to be dewaxed was admixed under hot conditions, typically at 70° C., but in each case above the cloud point, with the dewaxing solvents and the dewaxing aids, and stirred until a clear solution resulted. Then the mixture was cooled to the desired filtration temperature at a defined rate with temperature control. The filter was precooled to this temperature. All filtration conditions, such as solvent, feedstock ratio, ratio of the solvents in the case of use of solvent mixtures, cooling rates and filtration temperatures, corresponded to the conditions employed in the respective refinery.

After the filtration temperature had been attained, the mixture was transferred to the precooled filter and the vacuum was applied. Typically, a reduced pressure of 300 to 700 mbar was employed. The filtration volume was then determined as a function of time. The filtration was ended when no further liquid penetrated through the filter cloth.

In all filtration tests, an additization rate of 350 ppm based on polymers was employed.

Use Example 1

To determine the performance of the individual dewaxing aids, a 650N feedstock from an east European refinery was used, and the filtration volumes in ml were determined after the times shown in table 3.

Solvent system: 45% methyl ethyl ketone/55% toluene
Feedstock: solvent ratio=1:4.65
Procedure: 1) mixing at 70° C., 2) 30 min in a bath at 25° C., 3) 60 min in a bath at −25° C., filtration temperature: −25° C.

TABLE 3

| Filtration volume [ml] | | | | |
|---|---|---|---|---|
| Filtration time [s] | No additive | Example 1 | Comparative example 1 | Comparative example 2 |
| 5 | 4 | 13 | 5 | 4 |
| 10 | 7 | 19 | 8 | 8 |
| 15 | 9 | 24 | 10 | 10 |
| 20 | 11 | 28 | 12 | 11 |
| 25 | 12 | 32 | 13 | 13 |
| 30 | 13 | 35 | 15 | 15 |
| 35 | 15 | 38 | 16 | 16 |
| 40 | 16 | 41 | 17 | 17 |
| 45 | 17 | 44 | 18 | 18 |
| 50 | 18 | 47 | 19 | 19 |
| 55 | 19 | 50 | 20 | 20 |
| 60 | 20 | 52 | 21 | 21 |
| 65 | 21 | 54 | 22 | 22 |
| 70 | 22 | 57 | 23 | 23 |
| 75 | 22.5 | 59 | 24 | 23.5 |
| 80 | 23 | 61 | 25 | 24 |
| 85 | 24 | 63 | 26 | 25 |
| 90 | 24.5 | 65 | 27 | 26 |
| 100 | 25.5 | 69 | 28 | 27 |
| 110 | 27 | 71 | 30 | 29 |
| 120 | 28 | 72 | 31 | 30 |
| 130 | 29.5 | 73 | 33 | 32 |
| 140 | 31 | 73 | 34 | 33 |
| 150 | 32 |  | 35 | 34 |
| 160 | 33 |  | 37 | 35 |
| 170 | 34 |  | 38 | 37 |
| 180 | 35 |  | 39 | 38 |
| 190 | 36 |  | 40 | 39 |
| 200 | 37.5 |  | 42 | 40 |
| 240 | 42 |  | 46 | 44 |
| 270 | 44 |  | 49 | 47 |
| 300 | 47 |  | 52 | 50 |
| 360 | 52 |  | 57 | 55 |
| 420 | 57 |  | 62 | 59 |
| 480 | 61 |  | 66 | 63 |
| 540 | 65 |  | 70 | 67 |
| 600 | 68 |  |  | 70 |
| 660 | 70 |  |  | 72 |
| 720 | 71 |  |  |  |

| Filtration volume [ml] | | | |
|---|---|---|---|
| Filtration time [s] | Comparative example 6 | Comparative example 7 | Comparative example 8 |
| 5 | 3 | 5 | 5 |
| 10 | 8 | 9 | 9 |
| 15 | 12 | 12 | 13 |
| 20 | 14 | 14 | 16 |
| 25 | 17 | 16 | 18 |
| 30 | 19 | 18 | 20 |
| 35 | 21 | 20 | 22 |
| 40 | 23 | 21 | 24 |
| 45 | 25 | 23 | 26 |
| 50 | 26.5 | 24 | 27 |
| 55 | 28 | 25 | 29 |
| 60 | 29.5 | 27 | 30 |
| 65 | 31 | 28 | 32 |
| 70 | 32.5 | 30 | 33 |

TABLE 3-continued

| | | | |
|---|---|---|---|
| 75 | 34 | 31 | 34 |
| 80 | 35 | 32 | 36 |
| 85 | 36.5 | 34 | 37 |
| 90 | 38 | 35 | 38 |
| 100 | 40.5 | 37 | 40 |
| 110 | 43 | 39 | 43 |
| 120 | 45 | 41 | 45 |
| 130 | 48 | 43 | 47 |
| 140 | 50 | 45 | 50 |
| 150 | 52 | 47 | 52 |
| 160 | 54 | 48 | 54 |
| 170 | 56 | 50 | 56 |
| 180 | 57 | 52 | 58 |
| 190 | 59 | 54 | 60 |
| 200 | 61 | 55 | 62 |
| 240 | 67 | 61 | 69 |
| 270 | 72 | 65 | 73 |
| 300 | 74 | 67 | 73 |
| 360 | 76 | | |
| 420 | | | |

Use Example 2

To determine the performance of the individual dewaxing aids, a 500SN feedstock from a south-west European refinery was used, and the filtration volumes in ml were determined after the times shown in table 4.
Solvent system: 50% methyl ethyl ketone/50% toluene
Feedstock: solvent ratio=1:2.91
Procedure: 1) mixing at 60° C., 2) 15 min in a bath at 20° C., 3) 60 min in a bath at −22° C. filtration temperature: −22° C.

TABLE 4

| Filtration time [s] | Filtration volume [ml] | | | | |
|---|---|---|---|---|---|
| | No additive | Example 1 | Comparative example 1 | example 3 | Comparative example 4 |
| 5 | 4 | 13 | 13 | 6 | 5 |
| 10 | 8 | 23 | 21 | 11 | 8 |
| 15 | 11 | 28 | 28 | 15 | 12 |
| 20 | 13 | 34 | 35 | 18 | 14 |
| 25 | 15 | 39 | 39 | 20 | 15 |
| 30 | 17 | 43 | 43 | 23 | 17 |
| 35 | 19 | 47 | 47 | 25 | 18 |
| 40 | 20 | 51 | 50 | 27 | 21 |
| 45 | 22 | 54 | 53 | 29 | 22 |
| 50 | 23 | 58 | 57 | 31 | 23 |
| 55 | 25 | 61 | 60 | 33 | 25 |
| 60 | 26.5 | 64 | 63 | 34 | 26 |
| 65 | 28 | 67 | 66 | 36 | 27 |
| 70 | 29 | 71 | 68 | 37 | 28 |
| 75 | 31 | 72 | 70 | 38 | 30 |
| 80 | 32 | 72 | 71 | 40 | 31 |
| 85 | 33 | 73 | 72 | 42 | 32 |
| 90 | 34 | 73 | 73 | 43 | 33 |
| 100 | 36 | 74 | 74 | 45 | 35 |
| 110 | 39 | 74 | | 48 | 37 |
| 120 | 41 | | | 50 | 39 |
| 130 | 42.5 | | | 53 | 41 |
| 140 | 45 | | | 55 | 42 |
| 150 | 47 | | | 58 | 44 |
| 160 | 49 | | | 60 | 46 |
| 170 | 51 | | | 62 | 47 |
| 180 | 52 | | | 64 | 49 |
| 190 | 54 | | | 66 | 51 |
| 200 | 56 | | | 68 | 52 |
| 240 | 62 | | | 74 | 58 |
| 270 | 65 | | | 75 | 62 |
| 300 | 67 | | | | 66 |
| 360 | | | | | 71 |

Use Example 3

To determine the performance of the individual dewaxing aids, a brightstock from a south European refinery was used, and the filtration volumes in ml were determined after the times shown in table 5.
Solvent system: 50% methyl ethyl ketone/50% toluene
Feedstock: solvent ratio=1:3.80
Procedure: 1) mixing at 52° C., 2) 30 min in a bath at 5° C., 3) 60 min in a bath at −18° C., filtration temperature: −18° C.

TABLE 5

| Filtration time [s] | Filtration volume [ml] | | | | | |
|---|---|---|---|---|---|---|
| | No additive | Example 1 | Example 2 | Comp. ex. 1 | Comp. ex. 3 | Comp. ex. 4 |
| 5 | 6 | 11 | 14 | 8 | 9 | 5 |
| 10 | 9 | 24 | 26 | 14 | 14 | 8 |
| 15 | 12 | 35 | 36 | 18 | 19 | 11 |
| 20 | 15 | 43 | 44 | 24 | 23 | 13 |
| 25 | 17 | 51 | 52 | 26 | 26 | 15 |
| 30 | 19 | 59 | 58 | 29 | 30 | 17 |
| 35 | 21 | 65 | 65 | 31 | 33 | 19 |
| 40 | 22 | 71 | 72 | 33 | 36 | 20 |
| 45 | 24 | 76 | 77 | 35 | 39 | 21.5 |
| 50 | 26 | 79 | 80 | 37 | 41 | 23 |
| 55 | 27 | 80 | 81 | 39 | 43 | 24.5 |
| 60 | 28 | 80 | 81 | 41 | 45 | 26 |
| 65 | 30 | | | 42 | 48 | 27 |
| 70 | 31 | | | 44 | 50 | 28 |
| 75 | 32 | | | 45 | 52 | 29 |
| 80 | 34 | | | 47 | 54 | 30 |
| 85 | 36 | | | 49 | 56 | 31 |
| 90 | 37 | | | 51 | 58 | 32 |
| 100 | 39 | | | 53 | 61 | 34 |
| 110 | 41 | | | 56 | 64 | 36 |
| 120 | 43 | | | 59 | 67 | 38 |
| 130 | 46 | | | 61 | 71 | 40 |
| 140 | 48 | | | 63 | 74 | 42 |
| 150 | 50 | | | 66 | 76 | 43 |
| 160 | 52 | | | 68 | 79 | 45 |
| 170 | 54 | | | 71 | 80 | 47 |
| 180 | 56 | | | 72 | 81 | 49 |
| 190 | 57 | | | 74 | 81 | 50 |
| 200 | 59 | | | 79 | 82 | 52 |
| 240 | 66 | | | 80 | | 57 |
| 270 | 70 | | | | | 61 |
| 300 | 72 | | | | | 65 |
| 360 | 75 | | | | | 70 |
| 420 | 76 | | | | | 71 |

Use Example 4

To determine the performance of the individual dewaxing aids, a 500SN raffinate from a south European refinery was used, and the filtration volumes in ml were determined after times shown in table 5.
Solvent system: 45% methyl ethyl ketone/55% toluene
Feedstock: solvent ratio=1:2.3
Procedure: 1) mixing at 25° C., 2) 30 min in a bath at 5° C., 3) 60 min in a bath at −19° C., filtration temperature: −18° C.

TABLE 5

| Filtration time [s] | Filtration volume [ml] | | | |
|---|---|---|---|---|
| | No additive | Example 1 | Comparative example 1 | Comparative example 5 |
| 5 | 1 | 4 | 1 | 2 |
| 10 | 5 | 8 | 3 | 4 |

TABLE 5-continued

| Filtration time [s] | Comparative example 6 | Comparative example 7 | Comparative example 8 |
|---|---|---|---|
| 15 | 6 | 11 | 5 | 7 |
| 20 | 6.5 | 13 | 7 | 8 |
| 25 | 7 | 15 | 9 | 10 |
| 30 | 9 | 17 | 11 | 11 |
| 35 | 10 | 18 | 12 | 12 |
| 40 | 11 | 19 | 13 | 12.5 |
| 45 | 12 | 21 | 13.5 | 14 |
| 50 | 13 | 22 | 14 | 14.5 |
| 55 | 13.5 | 23 | 15 | 15.5 |
| 60 | 14 | 25 | 15.5 | 16.5 |
| 65 | 15 | 26 | 16 | 17 |
| 70 | 15.5 | 27 | 17 | 18 |
| 75 | 16 | 28 | 18 | 19 |
| 80 | 17 | 30 | 19 | 19.5 |
| 85 | 17.5 | 31 | 19.5 | 20 |
| 90 | 18 | 32 | 20 | 20.5 |
| 100 | 19 | 33 | 21 | 22 |
| 110 | 20 | 35 | 22 | 23 |
| 120 | 22 | 37 | 23 | 24 |
| 130 | 23 | 39 | 24 | 25.5 |
| 140 | 24 | 41 | 25 | 26.5 |
| 150 | 24.5 | 42 | 26 | 27.5 |
| 160 | 25 | 44 | 27 | 29 |
| 170 | 26 | 45 | 28 | 30 |
| 180 | 27 | 47 | 29 | 31 |
| 190 | 28 | 48 | 30 | 31.5 |
| 200 | 28.5 | 50 | 31 | 33 |
| 240 | 31 | 55 | 34 | 36 |
| 270 | 32.5 | 59 | 37 | 39 |
| 300 | 35 | 61 | 39.5 | 41 |
| 360 | 38 | 62 | 44 | 46 |
| 420 | 42 | | 48 | 50 |
| 480 | 45 | | 52 | 54 |
| 540 | 48 | | 56 | 57 |
| 600 | 51 | | 57 | 59 |
| 900 | 58 | | 59 | |

| | Filtration volume [ml] | | |
|---|---|---|---|
| Filtration time [s] | Comparative example 6 | Comparative example 7 | Comparative example 8 |
| 5 | 3 | 2 | 1 |
| 10 | 6 | 5 | 6 |
| 15 | 9 | 9 | 8 |
| 20 | 11 | 12 | 10 |
| 25 | 13 | 13 | 11.5 |
| 30 | 14 | 14 | 13 |
| 35 | 17 | 16 | 14.5 |
| 40 | 18 | 17 | 15.5 |
| 45 | 19 | 18 | 17 |
| 50 | 20 | 19.5 | 18 |
| 55 | 21 | 21 | 19 |
| 60 | 22 | 22 | 21 |
| 65 | 23 | 23 | 22 |
| 70 | 24 | 24 | 22.5 |
| 75 | 25 | 25 | 23 |
| 80 | 26 | 26 | 25 |
| 85 | 27 | 27 | 25.5 |
| 90 | 28 | 28 | 26 |
| 100 | 30.5 | 29 | 28 |
| 110 | 32 | 30 | 29 |
| 120 | 33 | 31 | 30.5 |
| 130 | 35 | 32.5 | 32 |
| 140 | 36.5 | 34 | 33 |
| 150 | 38 | 35 | 34 |
| 160 | 39 | 36 | 35.5 |
| 170 | 41 | 38 | 37 |
| 180 | 42 | 39 | 38 |
| 190 | 43 | 40 | 39 |
| 200 | 44 | 42 | 40 |
| 240 | 49 | 45 | 44.5 |
| 270 | 53 | 48 | 47 |
| 300 | 56 | 53 | 50 |
| 360 | 58 | 57 | 55 |
| 420 | 61 | 60 | 59 |
| 480 | | 62 | 60 |

In the filtration tests, it is clear that the filtrations using inventive examples 1 and 2 had ended significantly more rapidly than using the comparative examples. Surprisingly, it was also possible to increase the volume of oil filtered off. In addition, the use examples show that the inventive dewaxing aids can be used in a multitude of different starting compositions with great success with regard to filtering time and the yield of upgraded mineral oil obtained.

The invention claimed is:

1. A process for reducing a paraffin content of a mineral oil composition, the process comprising:
    adding a dewaxing aid to a mineral oil composition to obtain a mixture,
    cooling the mixture to form a paraffin precipitate, and
    at least partly removing the paraffin precipitate,
    wherein
    the dewaxing aid is a copolymer mixture comprising at least four copolymers,
    the copolymers of the copolymer mixture differ in composition of repeat units,
    and have repeat units derived from one or more alkyl methacrylates having 16 to 18 carbon atoms, and repeat units derived from one or more alkyl acrylates having 19 to 22 carbon atoms,
    wherein the copolymer mixture is obtained by copolymerization of a monomer mixture consisting of at least one alkyl acrylate and at least one alkyl methacrylate in one polymerization step.

2. The process of claim 1, wherein the copolymer mixture comprises at least five copolymers which differ in composition of repeat units.

3. The process of claim 2, wherein a proportion of any copolymer in the copolymer mixture is not more than 50% by weight.

4. The process of claim 1, wherein:
    at least three of the copolymers comprise at least two different repeat units derived from alkyl (meth)acrylates having 16 to 18 carbon atoms and repeat units derived from alkyl acrylates having 19 to 22 carbon atoms;
    at least one first copolymer having a higher proportion of repeat units derived from alkyl acrylates having 19 to 22 carbon atoms in an alkyl radical than at least two of the other copolymers;
    at least one second copolymer has a higher proportion of repeat units derived from alkyl methacrylates having 16 to 18 carbon atoms in an alkyl radical than at least two of the other copolymers; and
    at least one third copolymer has repeat units deprived from alkyl acrylates having 19 to 22 carbon atoms in an alkyl radical and having repeat units derived from alkyl methacrylates having 16 to 18 carbon atoms in an alkyl radical,
    the proportion in the third copolymer of repeat units derived from alkyl acrylates having 19 to 22 carbon atoms in the alkyl radical being lower than the proportion of these repeat units in the first copolymer, and
    the proportion in the third copolymer of repeat units derived from alkyl methacrylates having 16 to 18 carbon atoms in the alkyl radical being lower than a proportion of these repeat units in the second copolymer.

5. The process of claim 4, wherein a proportion of any copolymer in the copolymer mixture is not more than 50% by weight.

6. The process of claim 1, wherein a proportion of any copolymer in the copolymer mixture is not more than 50% by weight.

7. The process of claim 1, wherein the copolymer mixture has a crystallization transition in a range from 30° C. to 50° C.

8. The process of claim 1, wherein the copolymer mixture has a crystallization transition whose half-height width is at least 8° C.

9. The process of claim 1, wherein a copolymer of the copolymer mixture comprises at least 30% by weight of repeat units derived from the alkyl acrylates having 19 to 22 carbon atoms.

10. The process of claim 1, wherein the copolymer mixture has a weight-average molecular weight in a range from 200 000 to 500 000 g/mol.

11. The process of claim 1, wherein the process is performed in the presence of a solvent.

* * * * *